(12) United States Patent
Picard et al.

(10) Patent No.: US 9,152,715 B2
(45) Date of Patent: Oct. 6, 2015

(54) VISUAL APPROACH TO SEARCHING DATABASES

(71) Applicant: HEWLETT-PACKARD DEVELOPMENT COMPANY, L.P., Houston, TX (US)

(72) Inventors: Jean-Charles Picard, Villeneuve Loubet (FR); Jerome Albin, Sophia-Antipolis (FR); Dominique Pelissier, Sophia-Antipolis (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 40 days.

(21) Appl. No.: 13/693,626

(22) Filed: Dec. 4, 2012

(65) Prior Publication Data

US 2014/0089284 A1   Mar. 27, 2014

(30) Foreign Application Priority Data

Sep. 27, 2012   (EP) .................................... 12306175

(51) Int. Cl.
*G06F 17/30* (2006.01)
*G06F 7/00* (2006.01)

(52) U.S. Cl.
CPC .... *G06F 17/30864* (2013.01); *G06F 17/30398* (2013.01); *G06F 17/30554* (2013.01)

(58) Field of Classification Search
CPC ................................................ G06F 17/30398
USPC ......................................................... 707/706
See application file for complete search history.

(56) References Cited

U.S. PATENT DOCUMENTS

| | | | |
|---|---|---|---|
| 5,893,905 A | 4/1999 | Main et al. | |
| 6,701,342 B1 | 3/2004 | Bartz et al. | |
| 7,836,427 B1 * | 11/2010 | Li et al. | 717/117 |
| 8,041,616 B2 | 10/2011 | Cullen et al. | |
| 8,572,511 B1 * | 10/2013 | Barnett et al. | 715/848 |
| 2007/0073562 A1 * | 3/2007 | Brice et al. | 705/5 |
| 2007/0214179 A1 * | 9/2007 | Hoang | 707/104.1 |
| 2008/0243787 A1 * | 10/2008 | Stading | 707/3 |
| 2012/0166425 A1 * | 6/2012 | Sharma et al. | 707/722 |
| 2013/0132420 A1 * | 5/2013 | Vainer et al. | 707/769 |
| 2013/0268533 A1 * | 10/2013 | Komarov | 707/740 |

OTHER PUBLICATIONS

"Dynamic Service Provisioning Using GRIA SLAs", 2009, pp. 56-67, <http://eprints.soton.ac.uk/267594/1/dynamic-gria-sla.pdf>.
"IBM Tivoli Service Level Advisor", 2012, <http://www.monitortools.com/servicelevel/>.
"SLA Management Handbook", Oct. 2004, vol. 4, <http://www.afutt.org/Qostic/qostic1/SLA-DI-USG-TMF-060091-SLA_TMForum.pdf>.

* cited by examiner

*Primary Examiner* — Usmaan Saeed
*Assistant Examiner* — Raquel Perez-Arroyo
(74) *Attorney, Agent, or Firm* — Van Cott, Bagley, Cornwall & McCarthy, P.C.

(57) ABSTRACT

A visual approach to searching a database includes displaying a plurality of logical rules for searching a database, narrowing a search scope in response to a first selection of at least one logical rule, dividing the search scope into divisions in response to a second selection of at least one displayed criterion, and displaying each of the divisions in a search tree structure.

15 Claims, 5 Drawing Sheets

VISUAL APPROACH TO SEARCHING DATABASES

BACKGROUND

Search engines allow users to search the contents of one or multiple databases. Often, a collector collects and stores data from the database or databases. A search engine may sort the data and display the results on a computer screen according search instructions. The search engine may organize the search results into data tables with sorting and filtering capabilities to aid the user in finding the user's desired information within the search results.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Some databases contain thousands or millions of searchable documents. Thus, search results generated from searching such databases may be large and overwhelming to users. The principles described herein include a visual approach to searching databases, especially large volume databases.

The principles described herein include a method for searching databases. Such a method may include displaying a plurality of logical rules for searching a database, narrowing a search scope in response to a first selection of at least one logical rule, dividing the search scope into divisions in response to a second selection of at least one displayed criterion, and displaying each of the divisions in a search tree structure.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
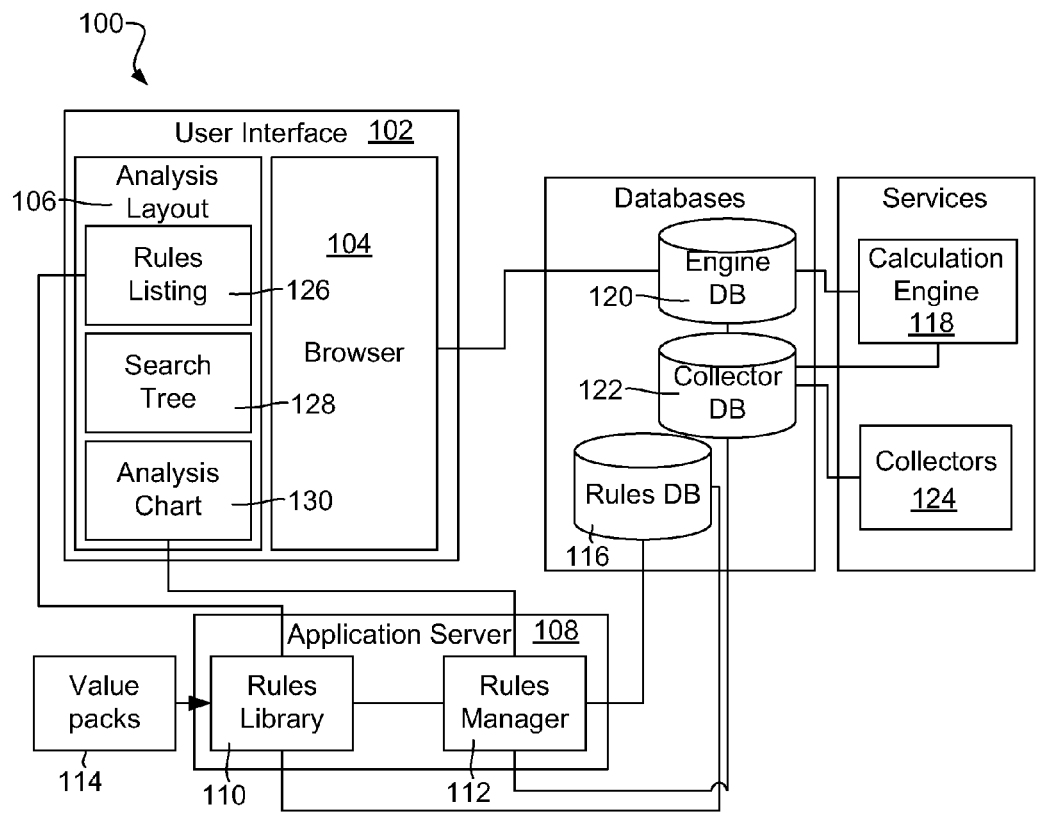
FIG. 1 is a diagram of an example of a system according to principles described herein.

FIG. 1 is a diagram of an example of a system (100) according to principles described herein. In this example, a user interface (102) contains a browser (104) for displaying search results and an analysis layout (106) that provides visual guidance through the searching process. The browser (104) is connected to several databases and services that carry out the searching process. Further, an application server (108) contains a rules library (110) and a rules manager (112) that is in communication with the databases.

The application server (108) may contain programs and/or machine readable code that causes search processes to be performed. In some examples, the application server is a centralized server that updates the applications and services in the system (100).

The rules library (110) may contain a number of logical rules that group contents of the databases into groups with similar attributes and/or characteristics. For example, the logical rules may perform calculations on the data in the databases to determine groups that may aid a user in a search. In examples where the searchable contents of the system (100) include contracts, calculations that the logical rules may determine include determining which client has the most contracts, where the clients with the most contract reside, which contracts were formed within a predetermined time period, which contracts include a compensation fee of over a predetermined threshold, other calculations, or combinations thereof.

A value pack (114) may include logic that determines how to break down the search content of the system (100) with logical rules to assist the user. The value pack (114) may analyze the search contents and develop logic rules. In some examples, the value pack (114) adds logical rules to the rules library (110). In some examples, the value pack (114) also evaluates the rules within the rules library (110) and removes rules that are no longer deem useful for a user. In some examples, the rules library (110) has a limited capacity to store rules, and the value pack (114) determines which rules are the most useful for users. In such an example, the value pack (114) removes those rules that are determined to be less valuable so that the capacity of the rules library (110) is maximized with the most helpful rules. In some examples, the rules library is in communication with a rules database (116) that stores a larger number of logical rules than the rules library (110). In some examples, lesser valuable logical rules are copied into the rules database (116) where lesser valuable logical rules are preserved and recalled at a later time. In some examples, the logical rules in the rules library (110) are displayed in the user interface (102), while the logical rules stored in just the rules database are not. However, the user interface (102) may include a search option that allows a search to locate the logical rules that were deemed to be a lesser value if the user desires to use such logical rules in his search.

The rules manager (112) may be in communication with the rules library (110) and with the user interface (102). The details of the user interface (102) will be described in more detail below, and the rules manager (112) may contain a program and/or machine readable code that causes selected logic rules to be executed to assist the user in his search.

The services may include a calculation engine (118) that is in communication with an engine database (120) and a collector database (122). A collector (124) may collect the data in the system (100) and put the data into the collector database (122). The calculation engine (118) may receive commands from the engine database (118), which is in communication with the rules manager (112), to search the collector database (122) according to selected logical rules. The calculation engine (118) may send the results to the browser (104) where the browser (104) presents the search results in a format understood by a user.

In the example of FIG. 1, the user interface (102) has an analysis layout (106) that includes a rules listing (126), a search tree structure (128), and an analysis chart (130). The rules listing (126) may be in communication with the rules library (110), and the rules listing (126) may display logical rules in the user interface (102) that may aid the user in his search. In some examples, the rules listing (126) contains the logical rules that the system (100) deems to be the most valuable for a user. In some examples, the logical rules in the rules listing (126) are common for all users. However, in other examples, the system (100) determines that the most valuable logical rules are those rules that are the most frequently used. In other examples, the selection of logical rules in the rules listing (126) is user specific. For example, the system (100) may determine which user is using the system (100) and accordingly place logical rules in the rules listings (126) based on the user's past behavior, profession, assignments within an organization, other factors, or combinations thereof.

The search tree structure (128) may be created in response to the selection of at least one of the logical rules from the rules listing (126). The search tree structure (128) may form an initial node in response to the first logical rule being selected. In response to selecting subsequent rules or selecting criteria, additional branch and/or leaf nodes may be formed. Each node formed by a rule or criteria selection may present the number of search objects based on each selection and any upstream rule or criteria selections. For example, if the user makes a first selection of a logical rule for determining which client has the highest aggregated value in contracts with the system's organization, then the search tree structure (128) may form a node that presents the number of contracts that have been entered into with that client. If the user then selects a criterion that breaks down the contracts number from the initially branch node into product lines categories, the search tree structure (128) may form several downstream leaf node that divide the original number into the respective product lines.

The analysis chart (130) may be populated with information from the nodes of the search tree structure (128). The analysis chart (130) may be in communication with the rules manager (112) to properly determine how to break down the numbers schematically represented in the selected node.

Figure 2:
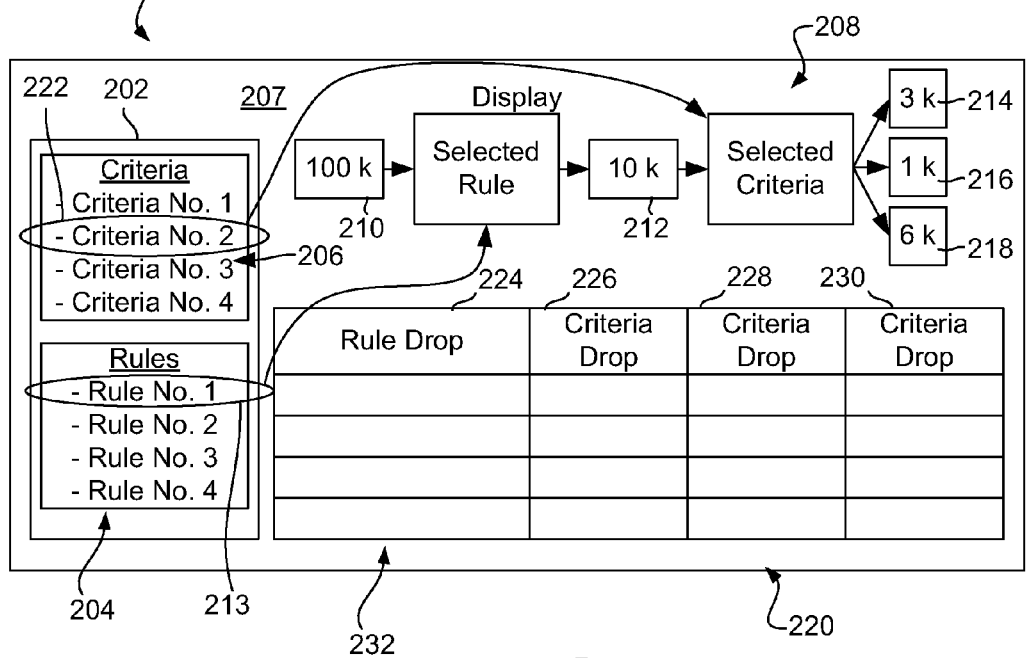
FIG. 2 is a diagram of an example of a display according to principles described herein.

FIG. 2 is a diagram of an example of a display (200) according to principles described herein. In this example, the display (200) has a listings section (202) that includes a rules listing (204) and a criteria listing (206). A drop space (207) adjacent the listings section (202) includes a search tree structure (208) with a base node (210), a branch node (212), and three leaf nodes (214, 216, 218). An unpopulated analysis chart (220) is depicted below the search tree structure (208).

The rules listing (204) may include a list of logical rules. The rules listing (204) may be a subset of the total number of logical rules available within the system. For example, the subset may include those rules deemed to be the most valuable or relevant to a user. In some examples, the rules listing (204) is customized for a specific user or the rules listing (204) changes in response to a user's behavior or assigned project. The rules listing (204) may be in communication with a rules library, a rules database, another rule storage mechanism, or combinations thereof. In some examples, logical rules are stored in a memory cache, a temporary memory cache, a permanent memory cache, a remote location, a local location, another location or type of memory, or combinations thereof.

The criteria listing (206) may include a list of criteria that further breaks down the scope of the search. For example, the logical rules may include calculations that calculate a number, where the criteria may be attributes of the results of the calculation of the logical rule. For example, the logical rule may calculate the number of service level agreements that are likely to be breached by the contracting party, and the criterion selected may be a region of a country where the agreement is located. In applying the example to the display illustrated in FIG. 2, the base node (210) may represent the total number of service level agreements that the organization has. In the example of FIG. 2, the total number of initial search objects is 100,000. The user may select the first rule (213) from the rules listing (204) by dragging and dropping the first rule (213) into the drop space (207). In response to the first selection of the first rule (213), the search tree structure (208) may form a branch node (212) that narrows the search scope to 10,000 agreements. Next, the user may select a second criterion (222) that represents geography. The attributes of the second criterion (222) may include three regions which may each be schematically represented with leaf nodes (214, 216, 218) with the appropriate number of contracts within that region.

The criteria listing (206) may be a subset of the total number of criteria available within the system. For example, the subset may include those criteria that are general to all or some of the logical rules. In some examples, the criteria listing (206) is specific to a selected logical rule. In some examples, the criteria listing (206) changes as different logical rules are selected. The criteria listing (206) may be in communication with a criteria library, a criteria database, or another rule storage mechanism. In some examples, the criteria are stored in a location and medium with the logical rules.

In the example of FIG. 2, the analysis chart (220) has a rule drop (224) and criteria drops (226, 228, 230). The attributes of the logical rule which is selected from the rules listing (204) may populate the column (232) associated with the rule drop (224). For example, the column (232) may fill in the fields with agreement values. In some examples, the user has the ability to manually drop the selected rule into the rule drop (224). In other examples, the logical rule attributes automatically fill into the fields in response to a selection of the branch node (212). The columns (234, 236, 238) associated with the criteria drops (226, 228, 230) may be filled in as the user drags and drops the leaf nodes (214, 216, 218) into the criteria drops (226, 228, 230).

Figure 3:
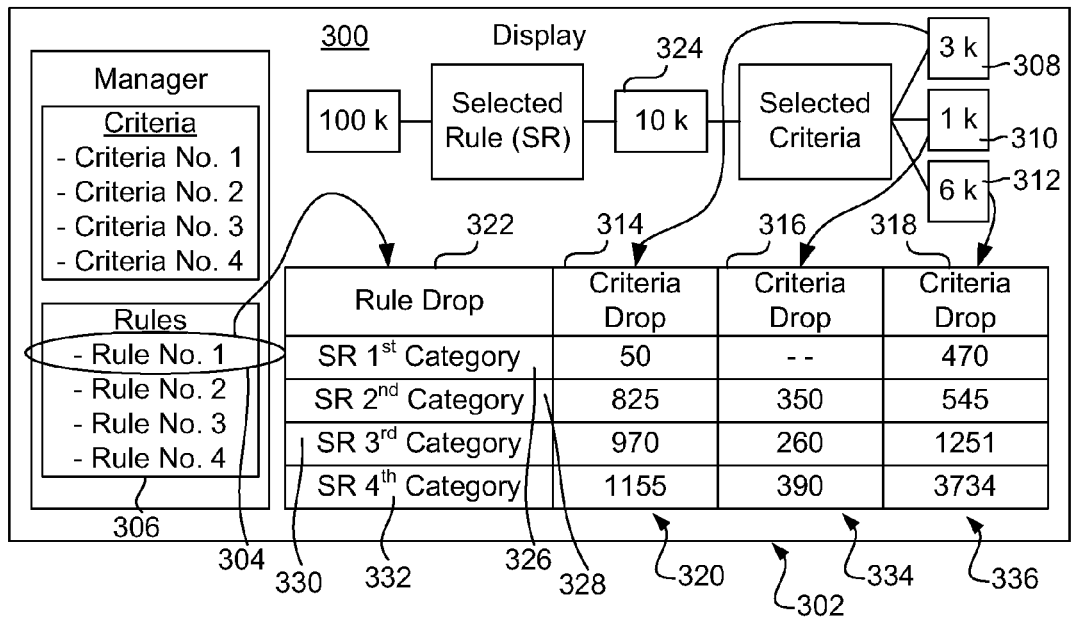
FIG. 3 is a diagram of an example of a display according to principles described herein.

FIG. 3 is a diagram of an example of a display (300) according to principles described herein. In this example, the chart (302) is populated with details about the divisions selected from the search. In this example, the first rule (304) is selected from the rules listing (306). Also, details about the search objects schematically represented with leaf nodes (308, 310, 312) are populated into the chart (302).

For example, if the search scope dealt with service level agreements and a selected criterion is geography, then the leaf nodes (308, 310, 312) may schematically represent the number of agreements in the respective regions. The leaf nodes (308, 310, 312) may be selected by dragging and dropping them into the criteria drops (314, 316, 318) of the chart (302). In response to the selection of the leaf nodes (314, 316, 318), data that schematically represents the search objects of each leaf node (314, 316, 318) is populated into the fields of the chart (302). In this example, the column (320) under the rule drop (322) is divided into categories. In some examples, the categories are divisions of the number that is schematically represented with the branch node (324). In some examples, the divisions are attributes of the search objects that are schematically represented with the number in the branch node (324).

In some examples where the search objects are service level agreements and the selected rule calculates the number service level agreements that are likely to be breached, the divisions or categories in column (320) may be the value of each service level agreement to the system's organization. In such an example, the first category (326) may be a first value threshold of over $1,000,000 dollars, the second category (328) may be a second value threshold of over $100,000 dollars, the third category (330) may be a third value threshold of over $10,000 dollars, and the fourth category (332) may be a fourth threshold value of $1,000 dollars. In such an example, the criteria selected for the second column (334) may be for those service level agreements that were in the United States of America (USA). Thus, the chart (302) may break down the service level agreements in the USA as having 50 that are over $1,000,000 dollars, 825 that are over $100,000 dollars, 970 that are over $10,000 dollars, and 1,155 that are over $1,000. The other columns (334, 336) may break down the service level agreements in these same categories for different regions. Thus, a user who is interested in identifying service level agreements that are at risk may use the visual approach of the system to guide his search.

Figure 4:
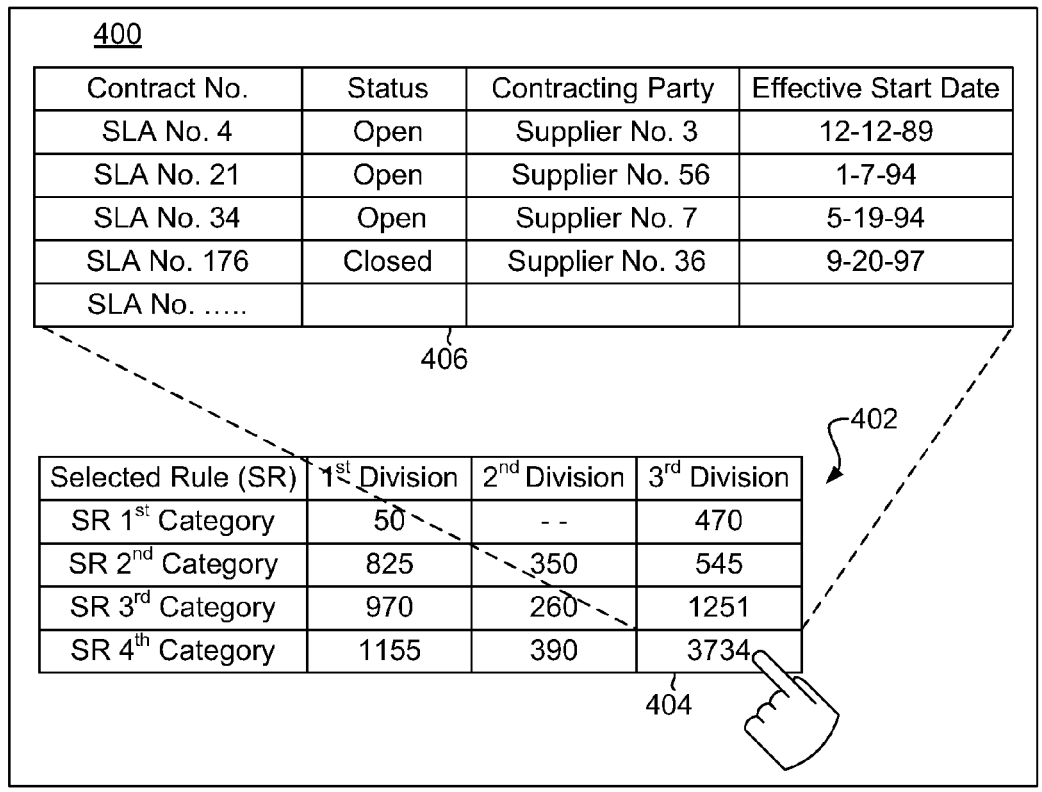
FIG. 4 is a diagram of an example of a display according to principles described herein.

FIG. 4 is a diagram of an example of a display (400) according to principles described herein. In this example, a portion of the display (400) containing the chart (402) is depicted for illustrative purposes. Here, a field (404) in the chart (402) is selected, and a window (406) appears in the display (400) in response to the field's selection.

In the example of FIG. 4, the window (406) contains a further break down of information specific to the search objects schematically represented with the number in the field (400). In the example of FIG. 4, the window (406) identifies each of the service level agreements by status, the contracting party, and the effective start date of the agreement. In other examples, more or less information is contained in the window (406) for each service level agreement identified. In some examples, a hyperlink to the actual service level agreement or a hyperlink to more information about each of the service level agreements may be included in each row in the window (406).

In some examples, the field (404) in the chart (402) has a hyperlink that pulls up the window (406). In other examples, a hyperlink of the field (406) takes the user to a different online location to view the search objects of the field (404). Any mechanism compatible with the principles described herein may be used to select the fields. In examples where the selection of a field from the chart (402) does not pull up a window, the user may be directed to another site or page to view additional information schematically represented in the field (404).

Figure 5:
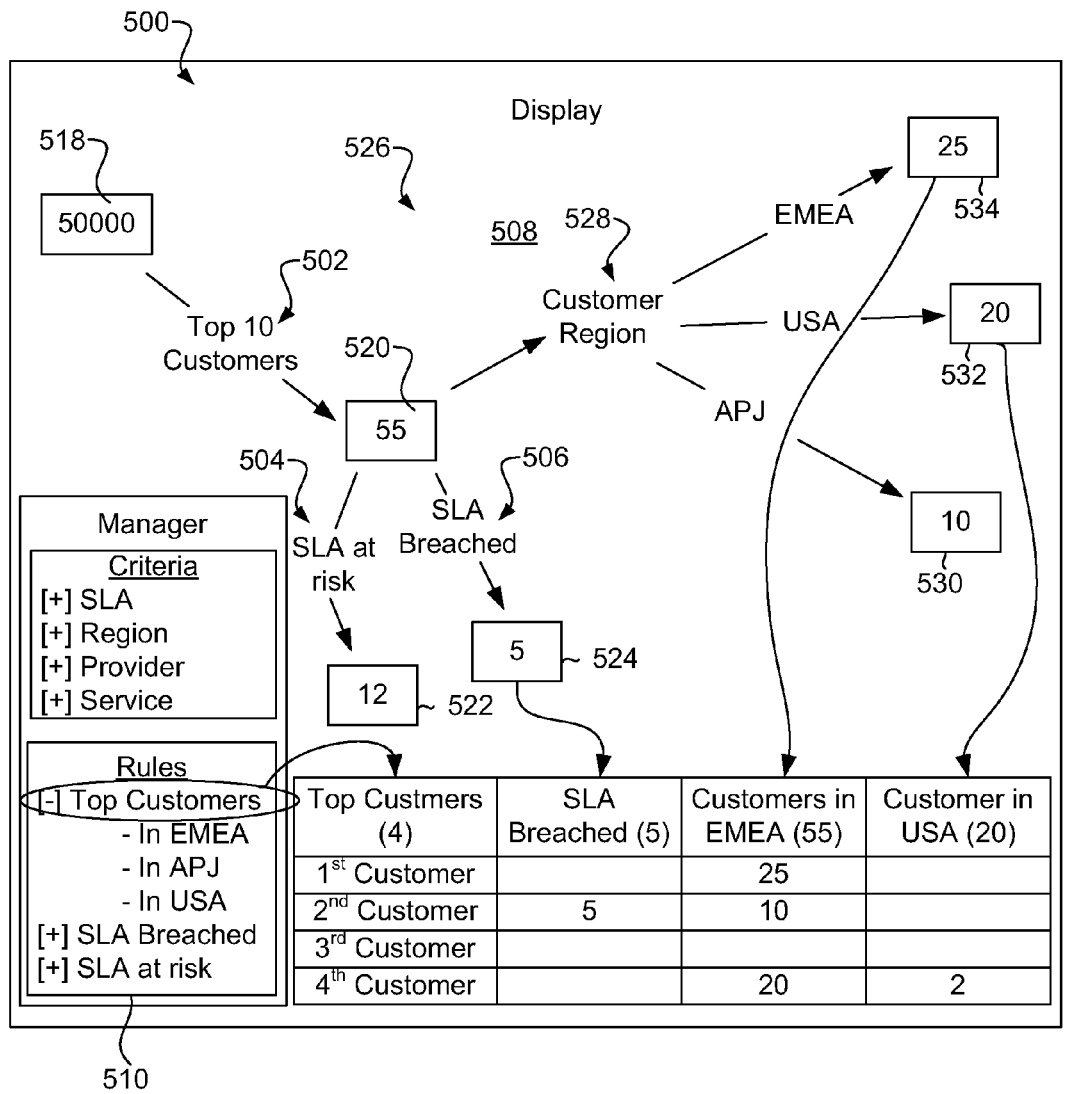
FIG. 5 is a diagram of an example of a display according to principles described herein.

FIG. 5 is a diagram of an example of a display (500) according to principles described herein. In this example, the display (500) depicts a several selected rules (502, 504, 506) that were dragged and dropped into the drop space (508). In the example of FIG. 5, the rules listing (510) includes a first logical rule (502) for identifying the top customers with which the system's organization has service level agreements, a second logical rule (504) for identifying the service level agreements that have already been breached, and a third logical rule (506) for identifying the service level agreements that are at risk for being breached.

In the example of FIG. 5, the first logical rule (502) was dropped into the drop space (508) close to the base node (518). The second and third rules (504, 506) were dropped into the drop space (508) such that they caused the first rule to be between themselves and the base node (518). The placement of the first logical rule (502) formed a branch node (520), which contains a number that schematically represents all of the service level agreements from the top customers. The placement of the second and third logical rules (504, 506) formed a first leaf node (522) and a second leaf node (524). However, the first leaf node (522) contains a number that schematically represents a subset of service level agreements that are both from the top customers and at risk for a breach. Similarly, the second leaf node (524) contains a number that schematically represents a different subset of service level agreements that are both from the top customers and that have already been breached. Thus, the selection of the second and third logical rules (504, 506) extends the search tree structure (526).

Likewise, in the illustrated example, a criterion (528) has been selected by dragging it into the drop space (508) such that just the branch node (520) is substantially between the base node (518) and the dropped criterion (528). The selected criterion (528) has three attributes into which it breaks down the search objects; thus, three additional leaf nodes are formed. The third leaf node (530), the fourth leaf node (532), and the fifth leaf node (534) each schematically represent regions of the world that contain the service contracts. In this example, the third leaf node (530) schematically represents the number of service level agreements in Asia, the Pacific, and Japan (APJ); the fourth leaf node (532) schematically represents the number of service level agreements in United States of America (USA); and the fifth leaf node (534) schematically represents the number of service level agreements in the Europe, the Middle East, and Africa (EMEA).

In the example of FIG. 5, a subset of the leaf nodes are selected to populate the chart (536). Here, just the second leaf node (524), the fourth leaf node (532), and the fifth leaf node (534) are selected to populate the chart. The selection of these leaf nodes (524, 532, 534) is driven by the user's input.

While the illustrated example has been described with reference to a particular search tree structure (526) with nodes in specific places, any search tree structure may be formed that is compatible with the principles described herein. For example, several layers of branch nodes may be formed to narrow the scope of the search to a desired amount of search objects for the user to investigate. In some example, the selection of a criterion forms branch nodes. Further, multiple rules that narrow the search scope or criteria that divide the existing search scope may be selected for the chart in any order. Further, a selected rule may be dropped into the drop space to create a downstream node from the dropped position of a criterion. In some examples, the dropped positions of rules or criteria are rearranged by the user to create a different search tree structure as desired. In some example, the user drops a rule or a criterion into the search tree structure such that it inserts a node into an already existing tree structure. In some examples, no specific order between the criteria and the rules in the search tree structure is specified. Thus, a criterion may be dropped into the drop space substantially proximate to the base node to form the first number of branch nodes while subsequently formed nodes are formed with the selection of the logical rules.

Figure 6:
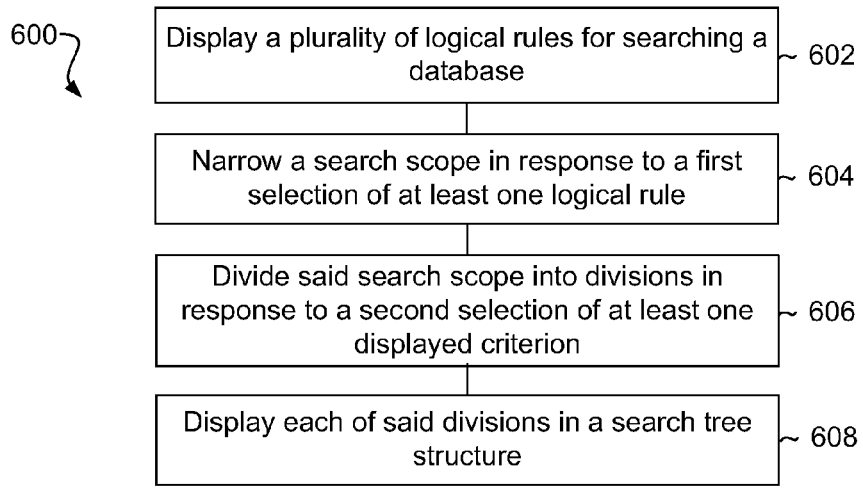
FIG. 6 is a diagram of an example of a method for searching a database according to principles described herein.

FIG. 6 is a diagram of an example of a method (600) for searching a database according to principles described herein. In this example, the method (600) includes displaying (602) a plurality of logical rules for searching a database, narrowing (604) a search scope in response to a first selection of at least one logical rule, dividing (606) the search scope into divisions in response to a second selection of at least one displayed criterion, and displaying (608) each of the divisions in a search tree structure.

The search tree structure may include at least one node that contains the divisions. A chart may display hyperlinks to search objects within the divisions in response to selecting a node of the search tree structure.

In some examples, displaying each of the divisions includes displaying a hyperlink to a list of objects within the divisions. Further, narrowing the search scope in response to a first selection of at least one logical rule includes narrowing the search into one of the plurality of logical rules being dragged from a display list of the rules to a node of a search tree structure. Also, dividing the search scope into divisions in response to a second selection of at least one displayed criterion includes dividing in response to a selected criterion being dragged from a displayed list of criteria to a node of a search tree structure.

In some examples, the numbers in the nodes is updated frequently. In such a manner, the user may interact with real time numbers, which may reduce and/or eliminate inefficiencies since the user is not reviewing outdated information.

Figure 7:
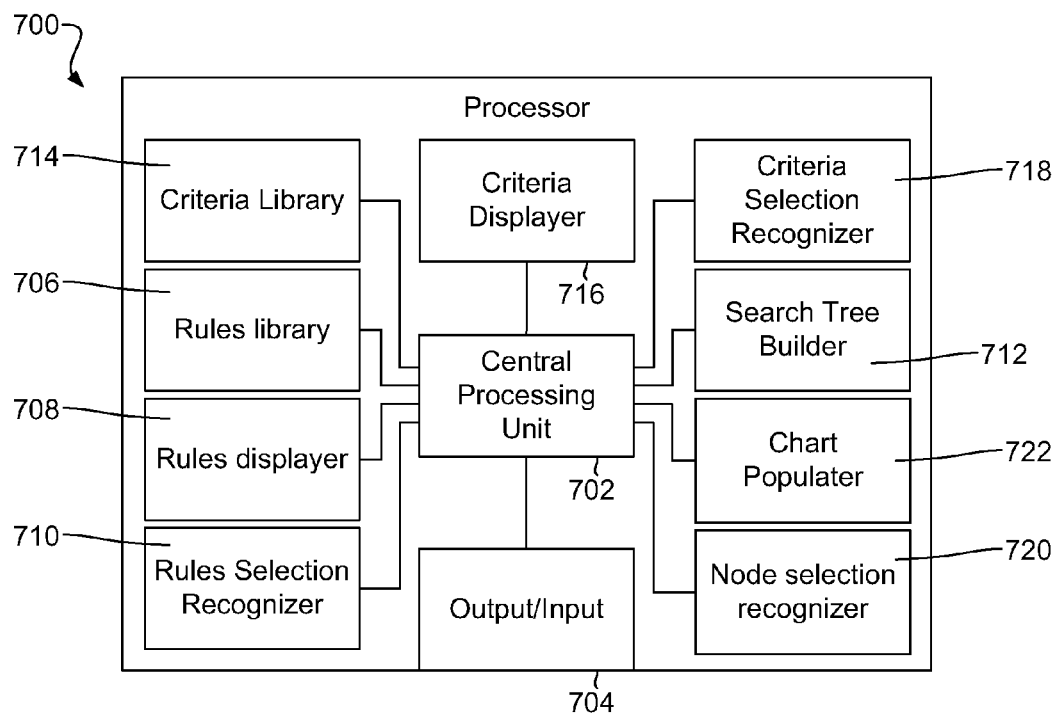
FIG. 7 is a diagram of an example of a processor according to principles described herein.

FIG. 7 is a diagram of an example of a processor (700) according to principles described herein. In this example, the processor (700) has a central processing unit (CPU) (702) in communication with an input/output (704). The input/output (704) may be in communications with a server, an application server, a database, a user interface, a manager, a library, a collector, an engine, an engine calculator, memory storage, another processor, or combinations thereof. In some examples, the processor (700) contains or is in communication with a non-transitory machine readable storage medium that contains machine readable code that causes the processor (700) to perform tasks.

A rulers library (706) of the processor (700) may contain at least one logical rule. In some examples, the rules library (706) is in communication with a rules database that contains additional logical rules.

A rules displayer (708) may display the rules from the rules library (706) in a display. In some examples, the display is formed on a monitor and/or digital screen. A rules selection recognizer (710) may recognize when a displayed rule has been selected. The rules selection recognizer (710) may recognize that a rule has been selected in response to the rule being dragged from a rules listing displayed in the display by the rules displayer (708). In other examples, the rules selection recognizer (710) recognizes the rules selection in response to other selection mechanisms.

A search tree builder (712) may build a portion of a search tree structure in response to a signal from the rules selection recognizer (710). The rules selection recognizer may indicate the position to where the selected logical rule was dropped, and the search tree builder (712) may build a tree node in an appropriate position based on the dropped position.

Further, a criteria library (714) may contain criteria that may be used to divide search objects within a search scope. A criteria displayer (716) may display the criteria in the display in a criteria listing. Also, a criteria selection recognizer (718) may recognize when a criterion is selected. In response to a signal from the criteria selection recognizer (718), the search tree builder (712) may extend the search tree structure accordingly.

A node selection recognizer (720) may recognize when a node of the search tree structure is being selected. In response to a signal from the node selection recognizer (720), a chart populater (722) may populate the chart with a break down of the search objects schematically represented in the selected node.

Figure 8:
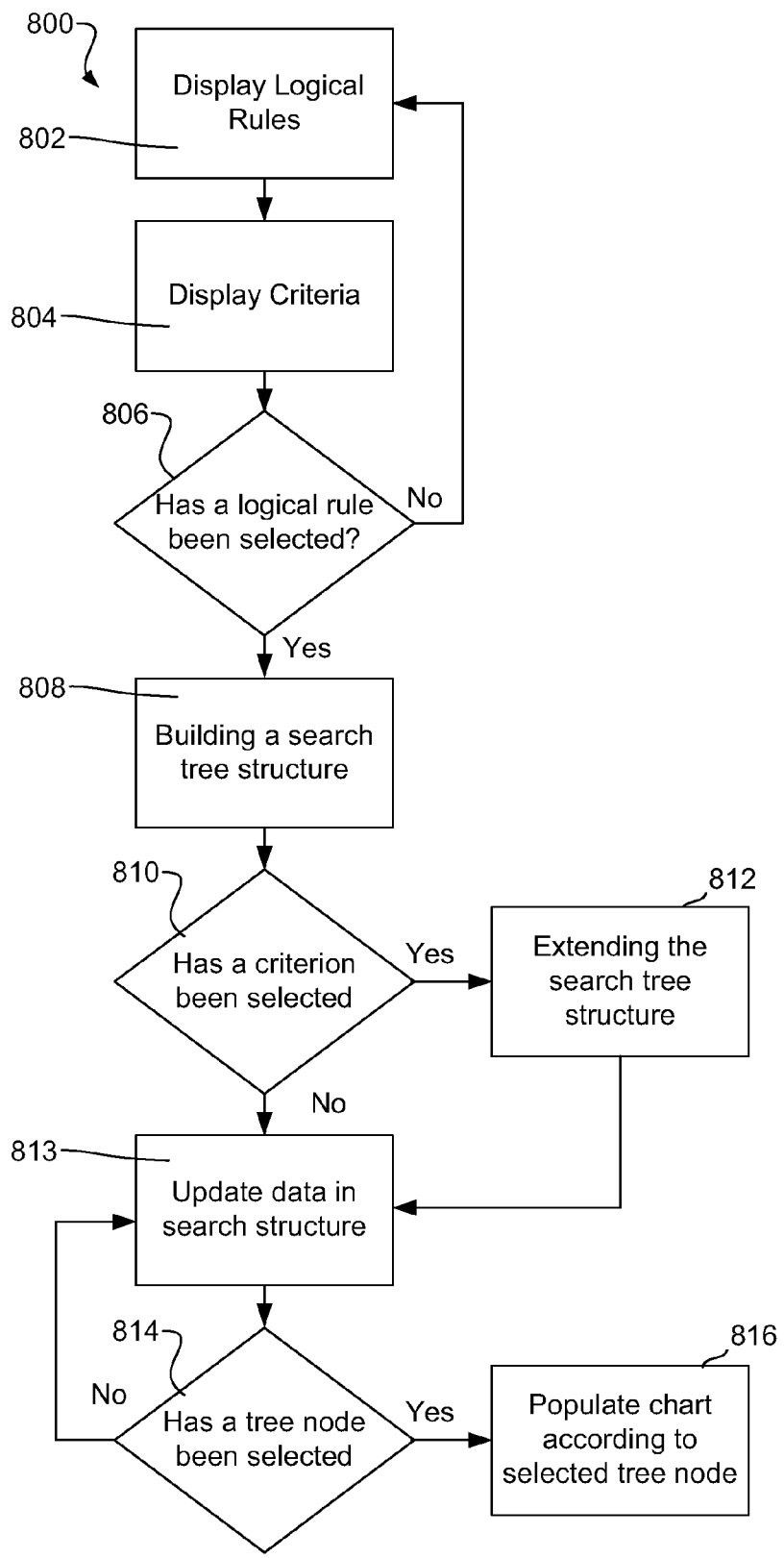
FIG. 8 is a diagram of an example of a flowchart of a process for searching a database according to principles described herein.

FIG. 8 is a diagram of an example of a flowchart (800) of a process for searching a database according to principles described herein. In this example, the process includes displaying (802) logical rules and displaying (804) criteria in a display. The process may include determining (806) whether a logical rule has been selected. If a logical rule has been selected, the process may include building (808) a search tree structure. In some examples, if no logical rule has been selected, then the process includes continuing to display the logical rules (802).

In some examples, regardless of whether a logical rule is selected, the process includes determining (810) whether a criterion is selected. If a criterion has been selected, then the process may include extending (812) the search tree structure to account for the criterion's selection.

In some examples, regardless of whether a criterion has been selected, the data in the search tree structure is updated (813). In such a manner, the user may interact with real time data.

The process may include determining (814) whether a tree node has been selected. If so, then the process may include populating (816) a displayed chart according to the selected tree node. In some examples, the chart contains hyperlinks to documents, search objects, more information about the search objects, or combinations thereof.

In some examples, the process also includes determining whether a field of the chart has been selected. If so, the process may include displaying additional detail about the search objects described in the field. In some examples, the field contains a hyperlink to a web page, a search object, another feature, or combinations thereof where the user may retrieve additional information.

The principles described herein may help the user sort and process information in databases in a visual format. In some examples, the databases have over a thousand, or even over a million, search objects through which the user may search for specific search objects.

While the examples above have been described with specific reference to selecting rules, criteria, and/or search tree nodes by dragging and dropping, any selection mechanism may be used that is compatible with the principles described herein. For example, the rules, criteria, and/or search tree nodes may be selected with a clicking mechanisms, voice commands, text inputs, touch screen inputs, camera recognized gesture movements, other mechanisms, or combinations thereof.

In some examples, the user specifies which types of rules and/or criteria that the user desires to be displayed in the rules listings and/or the criteria listings. In some examples, the user has the option of creating a rule or criteria to add to the rules library and/or criteria library. In some examples, the user suggests a type of rule that the system uses to determine which types of rules to create.

While the search objects described in the examples above have been described with specific reference to service level agreements, any search objects that are compatible with the principles described herein may be used. For example, the search objects may include contracts, personnel, servers, information technology devices, computers, products, research results, other agreements, documents, ancestors, other search objects, or combinations thereof.

While the examples above have been described above with reference to a specific type of chart, any type of chart may be used that is compatible with the principles described herein. For example, the chart may include graphs, bar graphs, line graphs, pie charts, spreadsheet information, text explanations, other forms of presenting information, or combinations thereof.

While the examples above have been described with reference to specific databases, servers, browsers, engines, calculators, and other system components; other system components may be used that are compatible with the principles described herein. Further, the components described in the examples above may be rearranged in different architectures or arrangements.

In the examples above, the visual layouts have been described with specific formats. However, according to the principles described herein, any visual layout may be used. For example, the chart may appear in response to the selection of a tree node, or the chart may be present in the display before data has been selected to populate the chart. In other examples, the search tree structure, the drop space, the criteria listings, the rules listings, and other features of the display may be located in other positions of the display.

The principles described herein may be used by any entity that uses databases. In some examples, the principles described herein may be used in operation centers, information technology environments, data centers, businesses, governments, other organizations, or combinations thereof. In some examples, the principles described herein may be used to search the internet or intranets.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of a visual approach to searching databases, comprising:
    generating a user interface viewable on a display of a computer, wherein the user interface includes a listing section that includes a rules listing subsection and a criteria listing subsection, a drop space section, and an analysis chart section including an analysis chart, and wherein a plurality of logical rules are displayed in the rules listing subsection for searching a database and a plurality of criteria are displayed in the criteria listing subsection;
    in response to a logical rule being moved from the rules listing subsection into the drop space section,
        narrowing an initial search scope, and
        generating a search tree structure in the drop space section, wherein the search tree structure includes a base node representing the initial search scope and a branch node connected to the initial node representing the narrowed, initial search scope;
    in response to a criterion being moved from the criteria listing subsection into the drop space section,
        dividing the narrowed, initial search scope into divisions, and
        including a leaf node for each of the divisions in the search tree structure, wherein each leaf node is connected to the branch node, and each leaf node represents search objects from the database that are in a respective one of the divisions; and
    in response to a selected leaf node from the search tree structure being moved into the analysis chart,
        determining categories in the analysis chart, and
        for each of the categories, determining the search objects for the selected leaf node that fall within the category, and displaying information in the analysis chart for the search objects that are determined to fall within the category.

2. The method of claim 1, comprising displaying, in the search tree structure, a hyperlink to a list of objects within each division.

3. The method of claim 1, comprising simultaneously displaying the listing section, the drop space section including the search tree structure, and the analysis chart section in a single display screen shown on the display of the computer.

4. The method of claim 1, wherein the displayed information in the analysis chart is different for each category.

5. A system of a visual approach to searching databases, comprising:
    a processor for managing at least one database, said processor programmed to:
        generate a user interface viewable on a display of a computer, wherein the user interface includes a listing section that includes a rules listing subsection and a criteria listing subsection, a drop space section, a search tree structure in the drop space section, and an analysis chart section including an analysis chart,
        wherein a plurality of logical rules are displayed in the rules listing subsection for searching the at least one database and a plurality of criteria are displayed in the criteria listing subsection, and
        wherein the listing section, the drop space section including the search tree structure, and the analysis chart section are simultaneously displayed in a single display screen shown on the display of the computer
        in response to a selected criterion being moved from the criteria listing subsection into the drop space section,
        divide a search scope into divisions based on the selected criterion, and include a leaf node for each of the divisions in the search tree structure,
        in response to a selected leaf node from the search tree structure being moved into the analysis chart,
        determine categories in the analysis chart, and
        for each of the categories, determine the search objects for the selected leaf node that fall within the category, and display information in the analysis chart for the search objects that are determined to fall within the category.

6. The system of claim 5, wherein said processor is further programmed to populate the analysis chart with hyperlinks to the search objects for each category.

7. The system of claim 5, wherein said at least one database comprises data about contractual agreements.

8. The system of claim 5, wherein the search tree structure comprises a base node representing an initial search scope, a branch node connected to the initial node representing a narrowed scope of the initial search scope based on a logical rule selected from the plurality of logical rules, and each of the leaf nodes connected to the branch node.

9. The system of claim 5, wherein the selected logical rule is selected in response to moving the selected logical rule from the rules listing subsection into the drop space section.

10. A computer program product for a visual to searching databases, comprising:
    a non-transitory computer readable storage medium, said non-transitory computer readable storage medium comprising computer readable program code embodied therewith, said computer readable program code executable by a processor to:
    simultaneously display, in a single display screen shown on a display of the computer, a listing section that includes a rules listing subsection and a criteria listing subsection, a drop space section, a search tree structure in the drop space section, and an analysis chart section including an analysis chart, wherein a plurality of logical rules are displayed in the rules listing subsection for searching a database and a plurality of criteria are displayed in the criteria listing subsection, in response to a selected criterion being moved from the criteria listing subsection into the drop space section,
divide a search scope into divisions based on the selected criterion, and include a leaf node for each of the divisions in the search tree structure, in response to a selected leaf node from the search tree structure being moved into the analysis chart,
determine categories in the analysis chart, and
for each of the categories, determine the search objects for the selected leaf node that fall within the category, and display information in the analysis chart for the search objects that are determined to fall within the category.

11. The computer program product of claim 10, wherein the computer readable program code is executable by the processor to populate the analysis chart with hyperlinks to the search objects for each category.

12. The computer program product of claim 11, wherein the displayed information in the analysis chart is different for each category.

13. The computer program product of claim 10, wherein the computer readable program code is executable by the processor to:

in response to a plurality of the leaf nodes being moved from the search tree structure into the analysis chart, determine for each of the leaf nodes, the search objects that fall into each category, and display separate information in the analysis chart for each of the leaf nodes and for each of the categories based on the search objects for each leaf node that fall into each category.

14. The method of claim 1, comprising:

in response to a plurality of the leaf nodes being moved from the search tree structure into the analysis chart, determining for each of the leaf nodes, the search objects that fall into each category, and display separate information in the analysis chart for each of the leaf nodes and for each of the categories based on the search objects for each leaf node that fall into each category.

15. The system of claim 5, wherein said processor is further programmed to:

in response to a plurality of the leaf nodes being moved from the search tree structure into the analysis chart, determine for each of the leaf nodes, the search objects that fall into each category, and display separate information in the analysis chart for each of the leaf nodes and for each of the categories based on the search objects for each leaf node that fall into each category.

* * * * *

UNITED STATES PATENT AND TRADEMARK OFFICE
CERTIFICATE OF CORRECTION

PATENT NO. : 9,152,715 B2  
APPLICATION NO. : 13/693626  
DATED : October 6, 2015  
INVENTOR(S) : Picard et al.

It is certified that error appears in the above-identified patent and that said Letters Patent is hereby corrected as shown below:

In the claims

Column 10, line 27, Claim 5, delete "computer" and insert -- computer, --, therefor.

Signed and Sealed this
Fourteenth Day of June, 2016

Michelle K. Lee
*Director of the United States Patent and Trademark Office*